(12) United States Patent
Jacob et al.

(10) Patent No.: US 11,591,083 B2
(45) Date of Patent: Feb. 28, 2023

(54) SPHERICAL VTOL AERIAL VEHICLE

(71) Applicant: THE BOARD OF REGENTS FOR OKLAHOMA STATE UNIVERSITY, Stillwater, OK (US)

(72) Inventors: Jamey D. Jacob, Stillwater, OK (US); Weng Kheong Loh, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 168 days.

(21) Appl. No.: 16/953,479

(22) Filed: Nov. 20, 2020

(65) Prior Publication Data

US 2021/0086894 A1   Mar. 25, 2021

Related U.S. Application Data

(62) Division of application No. 15/129,555, filed as application No. PCT/US2015/023134 on Mar. 27, 2015, now Pat. No. 10,850,836.

(60) Provisional application No. 61/970,954, filed on Mar. 27, 2014.

(51) Int. Cl.
| | |
|---|---|
| *B64C 37/00* | (2006.01) |
| *B64C 39/02* | (2023.01) |
| *B64C 1/30* | (2006.01) |
| *B64C 15/02* | (2006.01) |
| *B62D 57/00* | (2006.01) |

(52) U.S. Cl.
CPC .............. *B64C 37/00* (2013.01); *B64C 1/30* (2013.01); *B64C 15/02* (2013.01); *B64C 39/024* (2013.01); *B62D 57/00* (2013.01); *B64C 2201/027* (2013.01); *B64C 2201/042* (2013.01); *B64C 2201/108* (2013.01); *B64C 2201/126* (2013.01)

(58) Field of Classification Search
CPC .......... B64C 37/00; B64C 1/30; B64C 15/02; B64C 39/024; B64C 2201/027; B64C 2201/042; B64C 2201/108; B64C 2201/126; B64D 57/00
See application file for complete search history.

(56) References Cited

U.S. PATENT DOCUMENTS

| | | | |
|---|---|---|---|
| 6,634,593 B2 * | 10/2003 | Lepretre | B64C 39/024 244/93 |
| 6,976,899 B1 * | 12/2005 | Tamanas | B62D 57/04 446/454 |
| 9,067,667 B2 * | 6/2015 | Yan | A63H 27/12 |
| 9,611,032 B2 * | 4/2017 | Briod | B64C 17/00 |

(Continued)

*Primary Examiner* — Medhat Badawi
*Assistant Examiner* — Vicente Rodriguez
(74) *Attorney, Agent, or Firm* — Fellers, Snider, Blankenship, Bailey & Tippens, P.C.; Terry L. Watt

(57) ABSTRACT

An embodiment of the present disclosure relates to an unmanned flying robotic object that contains a wheeled mechanism that encircles its spherical exoskeleton. This feature allows the flying spherical vehicle to readily transform into a ground maneuverable vehicle. A robotic motor with differential speed capability is used to operate each wheel to provide effective ground maneuverability. There are examples provided herein of wheel configurations suitable for use with an embodiment. One is the straight- (or parallel) wheel design, and another is tilted-wheel design as are illustrated and discussed hereinafter. One embodiment of an unmanned flying robotic object taught herein is foldable.

11 Claims, 15 Drawing Sheets

(56) References Cited

U.S. PATENT DOCUMENTS

| | | | |
|---|---|---|---|
| 9,725,170 B2 * | 8/2017 | Daler | B64D 45/04 |
| 2004/0129833 A1 * | 7/2004 | Perlo | B64C 39/024 |
| | | | 244/70 |
| 2014/0131507 A1 * | 5/2014 | Kalantari | B60F 5/02 |
| | | | 244/2 |

* cited by examiner

SPHERICAL VTOL AERIAL VEHICLE

CROSS REFERENCE TO RELATED APPLICATIONS

This application is a divisional of co-pending U.S. patent application Ser. No. 15/129,555, filed Sep. 27, 2016, which application is a 371 Entry into the U.S. from PCT/US2015/023134, filed Mar. 27, 2015, which PCT application claims the benefit of U.S. Provisional Patent Application Ser. No. 61/970,954 filed on Mar. 27, 2014, and incorporates said applications by reference into this document as if fully set out at this point. No new matter has been added.

TECHNICAL FIELD

This disclosure is related to the unmanned air vehicles and, more particularly, to unmanned air vehicles for use by first responders that can hover, fly forward, have mobility on the ground, that have a self-up-righting capability and methods for controlling same.

BACKGROUND

In general, unmanned aerial vehicles ("UAVs") come in two forms, fixed wing and rotary wing, each having its own advantages and shortcomings. The former has limitations with take-off and landing, while the latter has limitations in stability, safety and endurance. Conventional fixed-wing designs can fly forward efficiently at high speed, but they cannot take-off and land vertically, and either runways or launch and recovery systems are required. On the other hand, rotor platforms such as helicopters and multi-rotors can take off and land vertically, but they cannot fly forward with high speed relative to fixed wing designs and have limited ground handling. Rotary platforms have the distinct advantage of hovering while staring directly at a target as long as power is available.

Open-tip propeller on both hand-tossed fixed wing UAVs and multi-rotor platforms can present safety hazards to the operator and are likely to get damaged upon contact with an object. These demands have led to the development of several shrouded fan vehicles with robust control systems. Likewise, multi-rotor systems have become extremely capable. Even though these vehicles may be shrouded and equipped with robust flight control system, the vehicles' orientation during take-off and landing relative to the terrain remains critical. In other words, a toppled vehicle has no further operational capability without human intervention. To design a search and rescue orientated UAV to operate in an urban or indoor environment, capabilities such as object detection and avoidance, hover, small landing footprint and self-recovering in an undesirable environment are some of the functionalities needed to be successful.

Among the many possible uses of such vehicle include search and rescue and damage assessment in disaster areas, including indoor proximal reconnaissance, power line and wind turbine inspection, oil and gas exploration, pipeline monitoring and inspection, tethered operation for weather monitoring, "Skycam" over a stadiums for security or observation of the event.

Heretofore, as is well known in the aircraft arts, there has been a need for a system and method of producing a robotic aircraft that does not suffer from the disadvantages of the prior art. Accordingly, it should now be recognized, that, there exists now, and has existed for some time, a very real need for a system that would address and solve the above-described problems.

Before proceeding to a description of the present disclosure, however, it should be noted that the description of the disclosure which follows, together with the accompanying drawings, should not be construed as limiting the disclosure to the examples (or embodiments) shown and described. This is so because those skilled in the art to which the disclosure pertains will be able to devise other forms of this disclosure within the ambit of the appended claims.

SUMMARY

According to an embodiment, the instant inventors have invented an unmanned aerial system (UAS) and method that is specifically designed based on engineering considerations to be as quiet as possible.

This disclosure teaches a spherical unmanned air vehicle for use by, for example, first responders and commercial entities and the like for air and ground surveillance that combines the benefits of hover, forward flight, ground mobility, and self-uprighting capability for return to flight.

According to an embodiment, the present disclosure relates to a multifunctional robotic vehicle designed for, e.g., search and rescue mission that combines the benefits of hover, forward flight, and ground maneuverability.

Moreover, an embodiment of the present disclosure relates to an embodiment of the present disclosure relates to an unmanned flying robotic object that contains a wheeled mechanism that encircles its spherical exoskeleton. This feature allows the flying spherical vehicle to readily transform into a ground maneuverable vehicle. A robotic motor with differential speed capability is used to operate each wheel to provide effective ground maneuverability. There are examples provided herein of wheel configurations suitable for use with an embodiment. One is the straight- (or parallel) wheel design, and another is tilted-wheel design as are illustrated and discussed hereinafter.

According to another embodiment, there is provided a self-righting remotely controlled generally spherical vehicle. In one embodiment, the vehicle rights itself by reversing the direction of the propeller(s) that are otherwise used for flight, where "reverse" means to rotate in a direction opposite the rotational direction that is used to power flight. In some embodiments, this will be done without adjusting the pitch of the propeller(s) so reversed. In this embodiment the force created from the reversed propeller will be enough to right the vehicle but will not provide enough thrust to generate lift.

One embodiment of the instant unmanned flying robotic object is foldable.

Taught herein is a foldable unmanned aerial vehicle, comprising: a fuselage, said fuselage containing a power source and avionics for receiving commands from a user and controlling said vehicle during a flight according to said received commands; at least one propeller in mechanical communication with said power source and in mechanical communication with said fuselage; at least four vertically oriented frame members, each of said frame members being rotatably supported on an inner edge by said fuselage and having a generally continuous semicircular shape on outer edge, wherein said at least four frame members are rotatable about said fuselage between a planar configuration and spherical configuration.

Also taught herein is a self-uprightable unmanned aerial vehicle, comprising a fuselage, said fuselage containing a power source and avionics for receiving commands from a user and controlling said vehicle during a flight according to said received commands; at least one propeller in mechanical communication with said power source and in mechanical communication with said fuselage, wherein one or more of said at least one propellers is reversible; at least four vertically oriented frame members, each of said frame members being supported on an inner edge by said fuselage and having a generally continuous semicircular shape on outer edge, thereby giving said vehicle a generally spherical shape.

Additionally taught herein is a self-uprightable unmanned aerial vehicle, comprising: a fuselage, said fuselage containing a power source and avionics for receiving commands from a user and controlling said vehicle during a flight according to said received commands; at least one propeller in mechanical communication with said power source and in mechanical communication with said fuselage, wherein one or more of said at least one propellers is reversible; at least four vertically oriented frame members, each of said frame members being supported on an inner edge by said fuselage and having a generally continuous semicircular shape on outer edge, thereby giving said vehicle a generally spherical shape.

Further taught herein is a method of returning to an upright position an unmanned spherical aerial vehicle containing at least one propeller that is utilized for flight, comprising the steps of: determining a first rotational direction of said at least one propeller, said first rotational direction providing at least part of a thrust required to lift said vehicle into flight; determining a second rotational direction opposite said first rotational direction; determining that said spherical aerial vehicle is not in said upright position; rotating at least one of said at least one propeller in said second rotational direction until said vehicle is at least approximately upright; and, rotating said at least one of said at least one propeller in said first rotation direction, thereby providing at least part of the thrust required to lift said vehicle into flight Additionally taught herein is a spherical unmanned aerial ground mobile vehicle, comprising: a fuselage, said fuselage containing a power source and avionics for receiving commands from a user and controlling said vehicle during a flight according to said received commands; at least one propeller in mechanical communication with said power source and in mechanical communication with said fuselage, wherein one or more of said at least one propellers is reversible; at least four vertically oriented frame members, each of said frame members being supported on an inner edge by said fuselage and having a generally continuous semicircular shape on outer edge, thereby giving said vehicle a generally spherical shape; and, at least one wheel in mechanical communication with a rover power source within said fuselage, said at least one rover wheel having an outer perimeter that extends beyond said outer edges of said frame members to contact the ground when the vehicle is resting thereon, such that rotation of said at least one rover wheel by said rover power source provides ground mobility to said vehicle.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION

Figure 1:
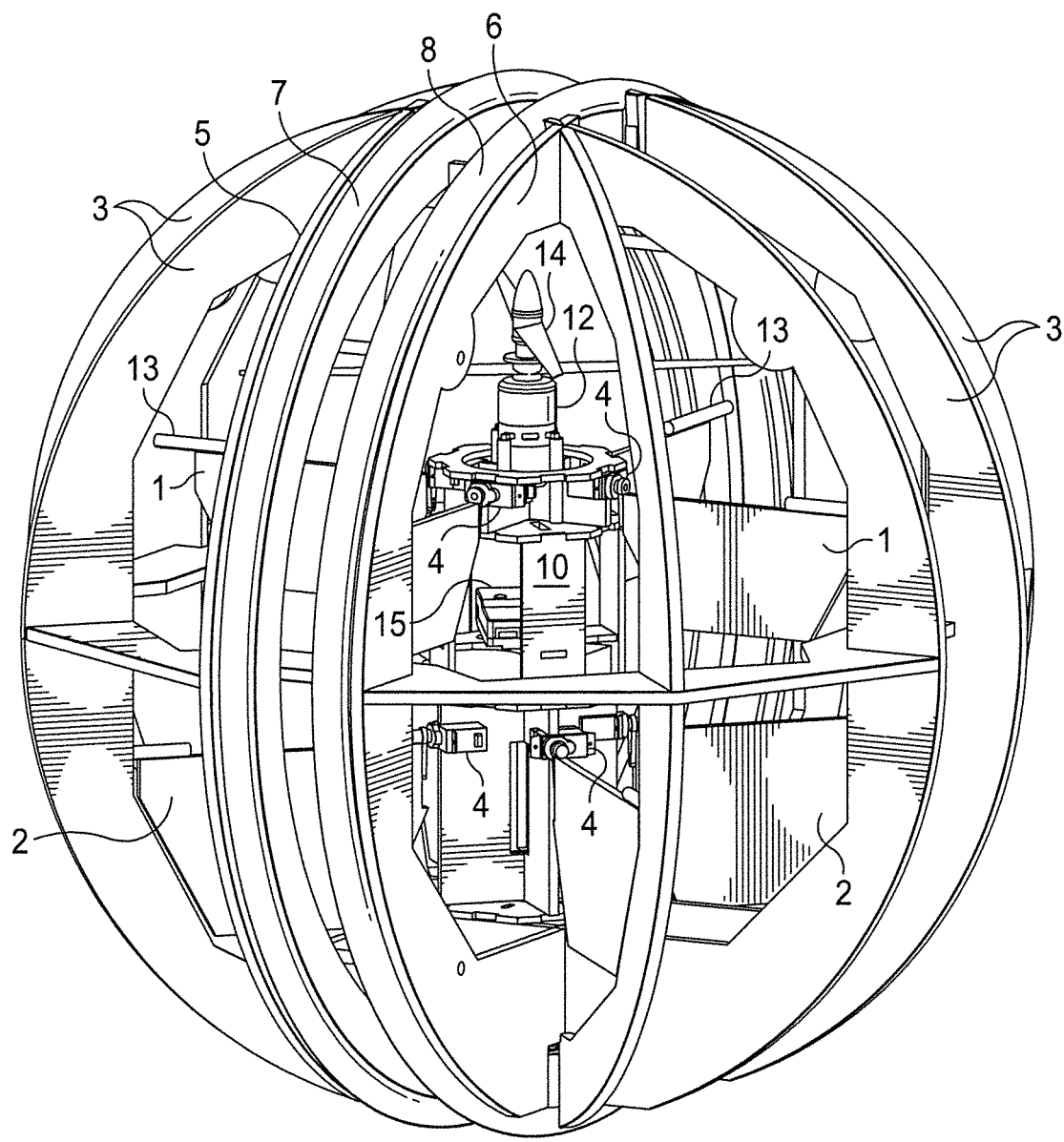
FIG. 1 contains a schematic drawing of a straight-wheeled embodiment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

An embodiment is a multi-functional scalable spherical robotic vehicle designed for search and a rescue application that combines the advantages of vertical takeoff, vertical landing, hover, forward flight, and ground mobility. A variation consists of a single propeller controlled by multiple control vanes enclosed in a reinforced spherical frame with an onboard micro-controller for stabilization and control. That being said, embodiments that utilize multiple propellers are also possible.

Continuing with the previous example, an embodiment has a diameter of about 20 inches and weighs about 2 lbs. Of course, those of ordinary skill in the art will recognize that other sizes are certainly possible. This form factor can easily fly through a typical door or window frame under remote pilot (user) control. Communications between the controlling user and the vehicle might be handled a using wireless communication connection (e.g., via Bluetooth, Wifi, radio signals, cellular telephone, etc.) or, less likely but still possible, a wired connection. In some embodiments, the control information will be generated using a hardware controller (e.g., one with joysticks or a similar arrangement) to allow real-time control of the vehicle or, in other instances, the control signals might originate from a preprogrammed/automated flight plan that is under control of a desktop, laptop, cell phone, table computer, etc.

A feature of this embodiment of the UFRO is the ability to self-upright in any environment, which ability is not present in UAV platforms such as ducted fan or multi-rotor systems. More specifically, in one embodiment, the subject UFRO rights itself by reversing the rotational direction of the propeller(s) that are otherwise used for flight, where "reverse" means to rotate in a direction opposite that used to power flight and generate thrust in a downward direction when the UFRO is upright. In some embodiments, this will be done without adjusting the pitch of the propeller(s) so reversed. In this embodiment the force created from the reversed propeller will be enough to right the vehicle but will not provide enough thrust to generate lift. One advantage of this approach is that it does not require any particular distribution of weight within the vehicle. Reversal of the thrust will tend to roll the instant spherical vehicle until the reversed propeller is on top of the sphere. Then, that propeller can be reversed again to provide lift so that the instant vehicle can become airborne.

The spherical frame taught herein also allows the vehicle to encounter an object without the risk of damaging the onboard components, and can land anywhere without the need of coordinated landing maneuverability. Ground mobility is currently achieved using the slipstream generated by the propeller combined with vane deflection, which allows the vehicle to maneuver in small spaces on the ground without other ground control systems. An embodiment has successfully performed all of these operations under remote pilot control.

Figure 2:
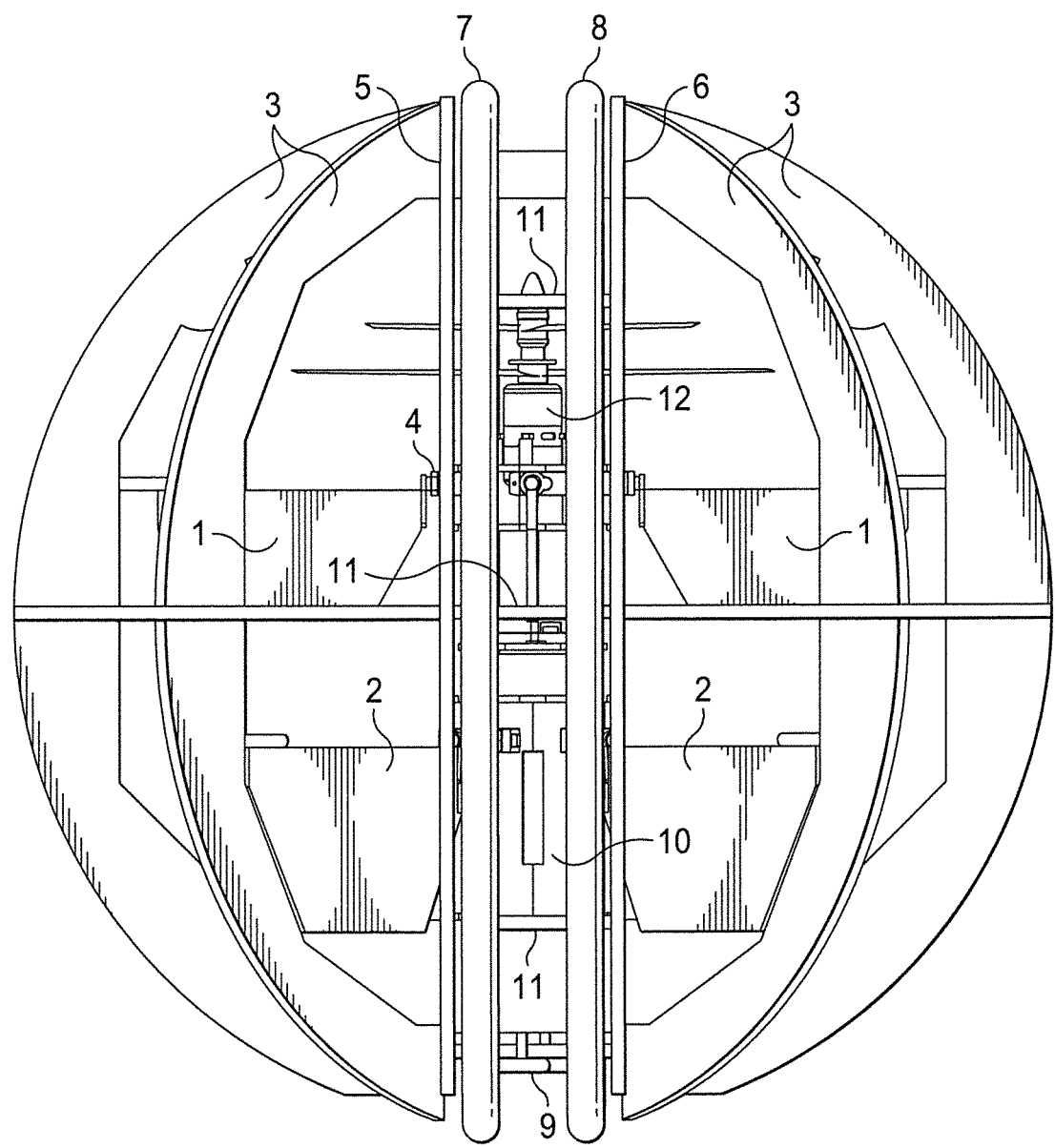
FIG. 2 contains a rotated view of the embodiment of FIG. 1.
Figure 3:
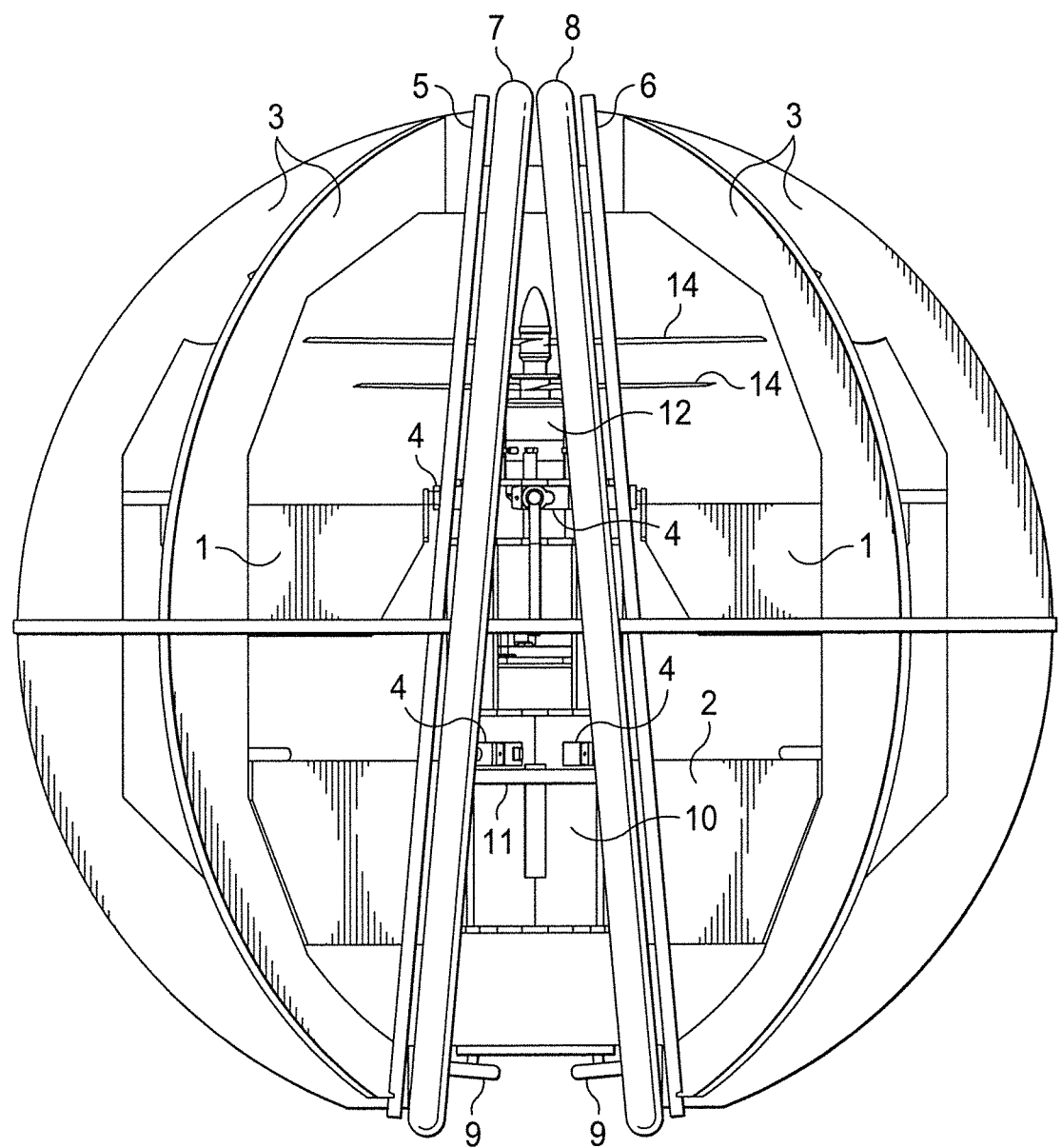
FIG. 3 contains another view of an embodiment.
Figure 4:
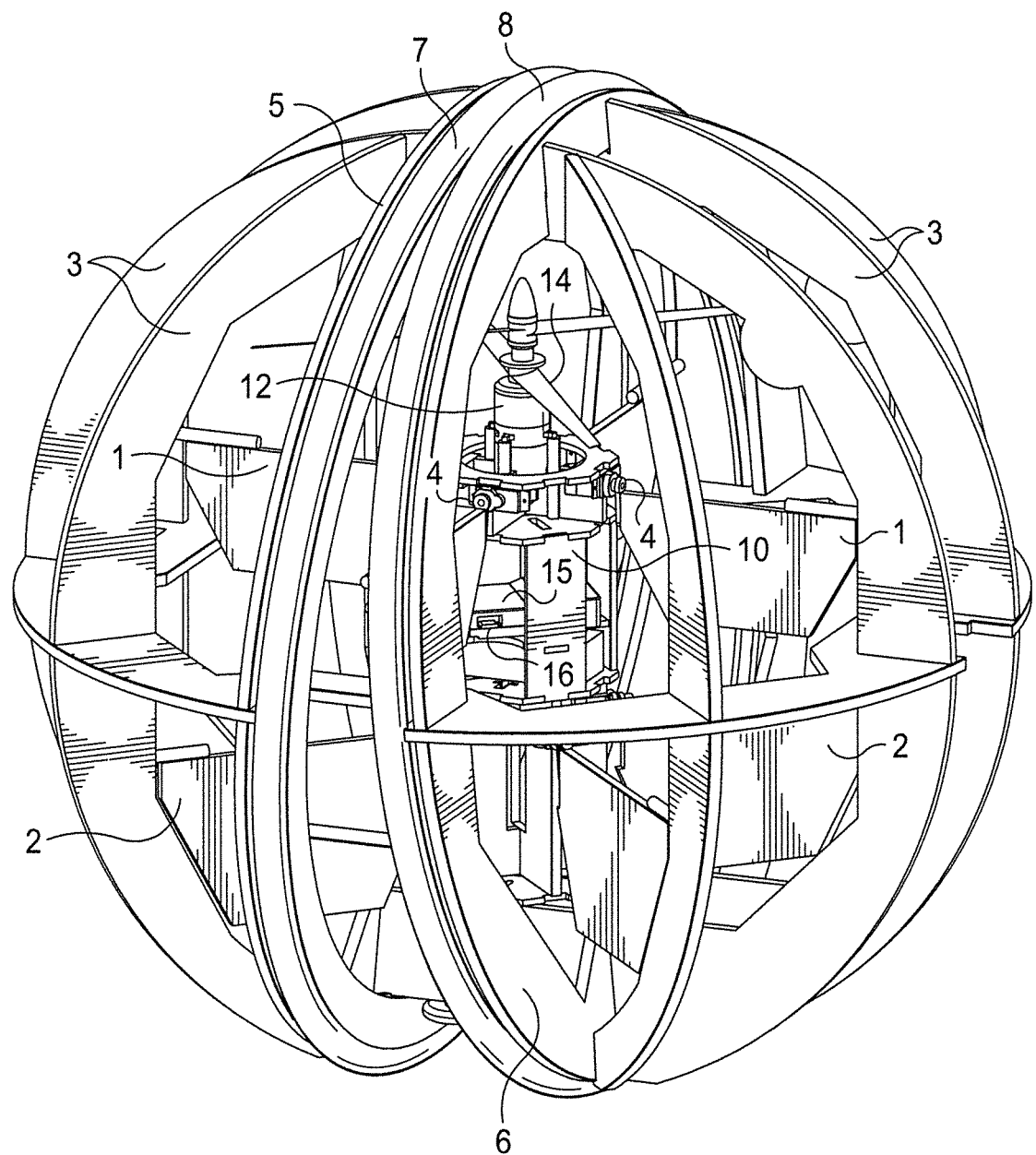
FIG. 4 shows an embodiment of tilted wheel embodiment.
Figure 5:
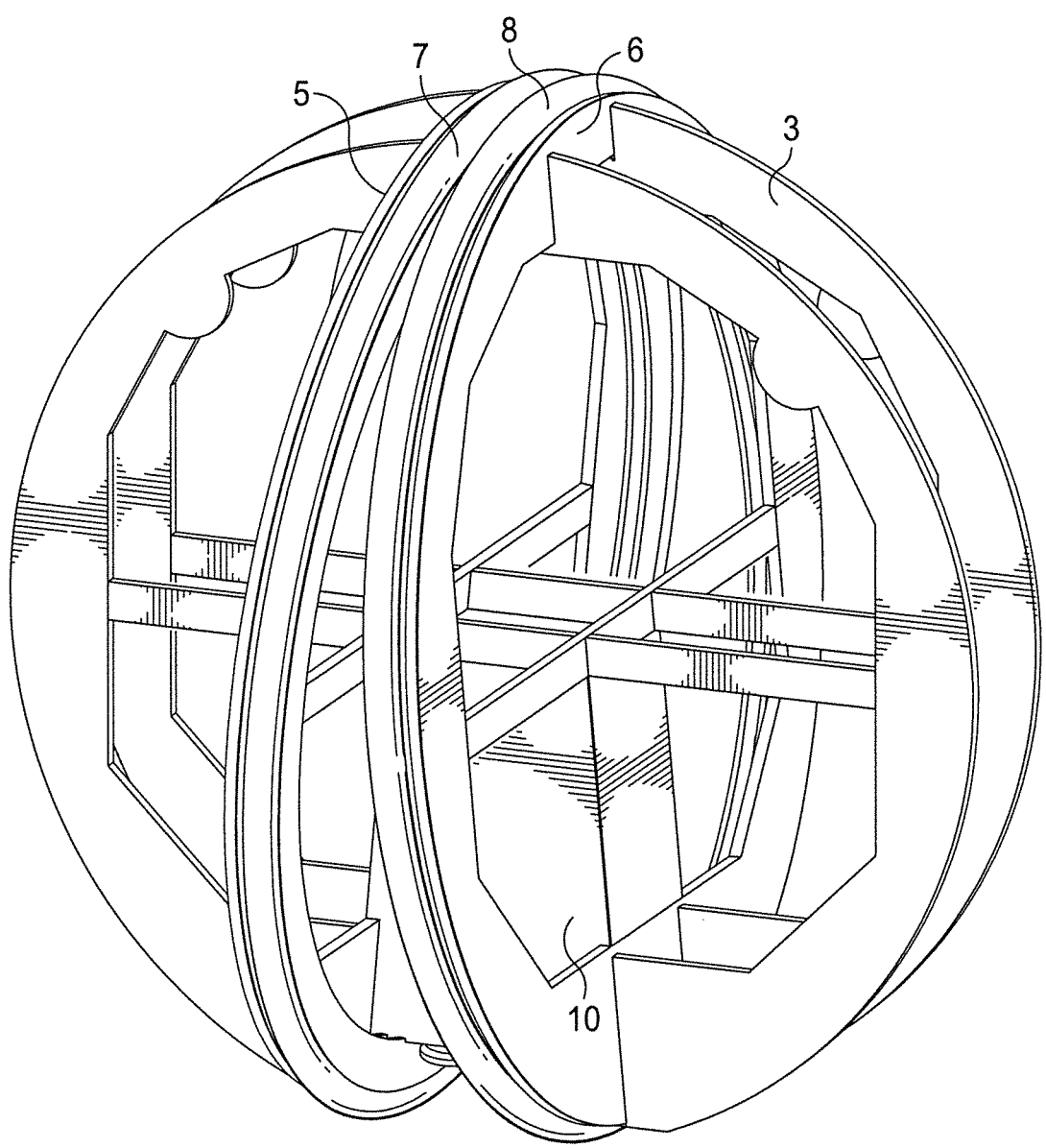
FIG. 5 contains a photographic representation of an example device built consistent with the teachings herein.

Turning first to the particular example of FIG. 1, according to an embodiment the internal components at the center of the spherical exoskeleton consist of four top control vanes 1, four bottom control vanes 2, servos 4, and an electric motor 12. In this embodiment these components operate separately from the rover system which provides ground mobility (discussed below) and are principally needed for flight control. The spherical exoskeleton 3 is designed to protect the avionic components (which could include items 1, 2, 4, 12, 14, and 15) and act as structural support that hold the wheels of the rover system in place. The fuselage 10 is compartmentalized to store the avionics (hardware and software) necessary for flight control including, without limitation, a wireless communication module (for receiving and transmitting information to and from the controlling user), a CPU (to interpret commands from the controlling user and to control the servos and electric motor, etc.), a propulsion system for powering the propeller and adjusting the pitch of the blades, and, optionally, the rover control system. For purposes of reference in the text that follows, the following is a listing of the elements that are annotated in the embodiments of FIGS. 1-7:

1—Top control vane/surface
2—Bottom control vane/surface
3—Carbon fiber reinforced foam core frame
4—Servo
5—Mounting Plate
6—Mounting Plate
7—Wheel
8—Wheel
9—Electric Motor with small rubber wheel
10—Fuselage
11—Nylon control rod
12—Propulsion System (electric motor)
13—Hinge
14—Propeller
15—Controller board
16—USB port
17—Center of Mass According to the embodiments of FIGS. 1 and 2, the vehicle's rover system with straight-wheel design comprises multiple control rods 11, two rotationally stationary mounting plates 5 and 6, coupled to the exoskeleton frame, and two rotatable wheels 7 and 8, concentric with the inner hoop/plate. In this variation both of the wheels 7 and 8 are fabricated with reinforced plates, although other variations are certainly possible and well within the ability of one of ordinary skill in the art to devise.

Figure 15A:
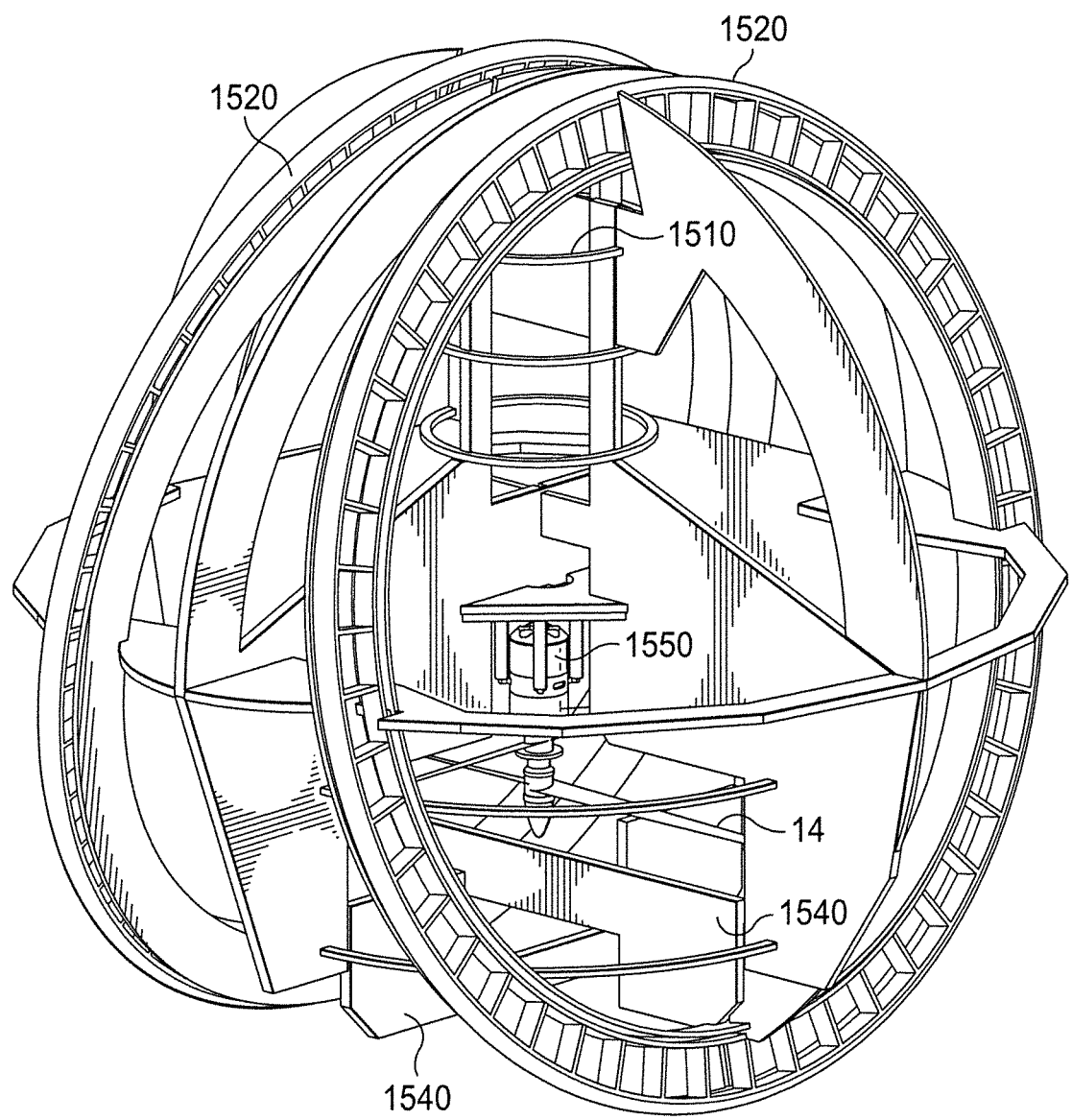
FIGS. 15A and 15B each contain a schematic diagram of a different tilted wheel embodiment.
Figure 15B:
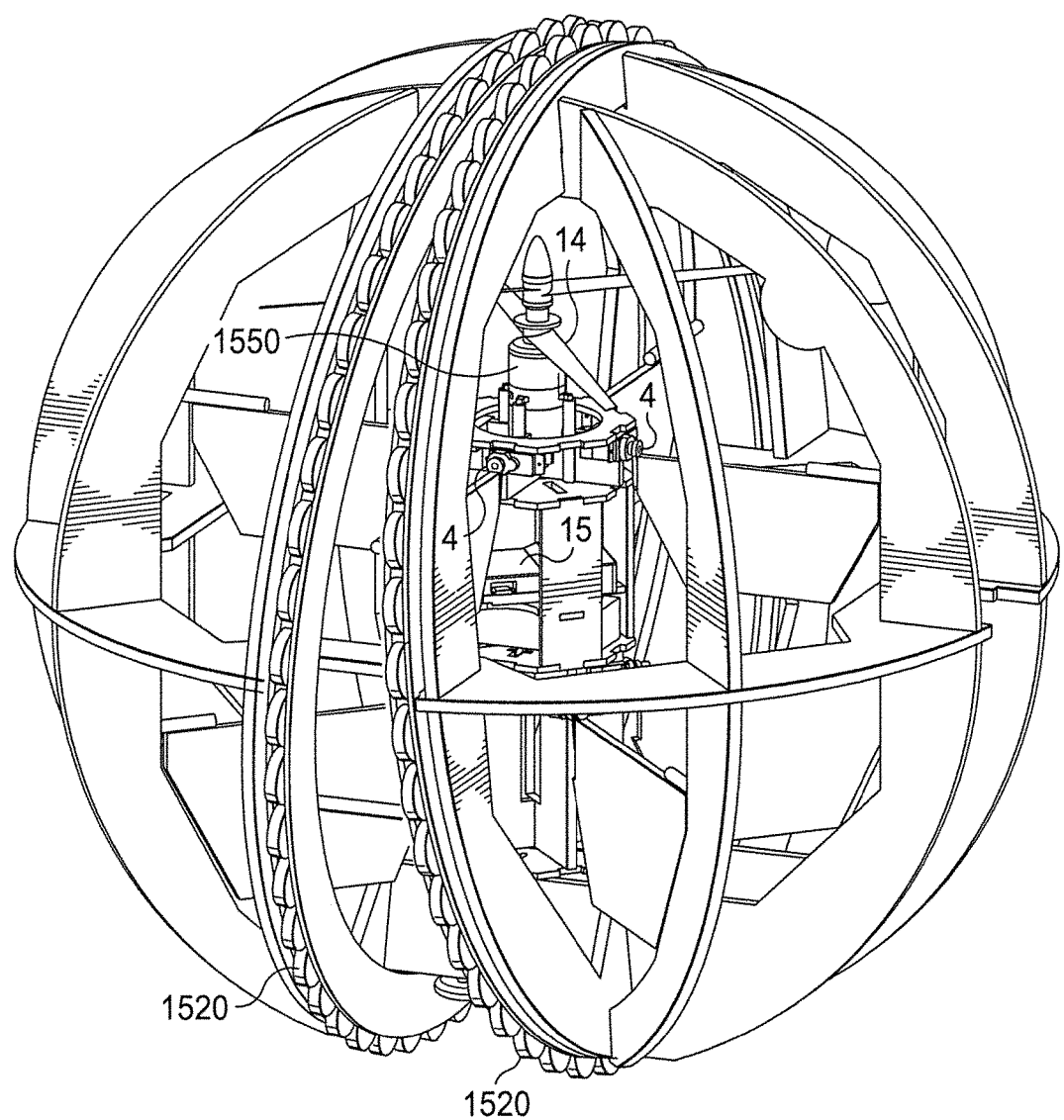

A ground engaging tread material may be attached on the radial periphery of the wheel (see, for example, 1520, FIG. 15B). This allows traction when the device is on the ground. Preferably multiple rods are spaced circumferentially around the mounting plate at approximately 45 degrees intervals. In this embodiment they are mounted on the mounting plate and bonded with the rest of the exoskeleton frame 3. The length of the rod 11 defines the gap spacing between the two mounting plates. The wheels 7 and 8 in this embodiment are radially and axially supported relative to the mounting plates 5 and 6 through this engagement to allow rotation.

In some embodiments, the components for the tilted-wheel design (FIGS. 3 and 4) will be the same as those of the straight-wheel design as depicted in FIGS. 1 and 2. One difference is that the two rotationally stationary mounting plates 5 and 6 will be tilted inward in the tilted-wheel variation. In both embodiments, this sort of configuration (two circular wheels that operate on the periphery of the sphere) assists the vehicle in becoming upright (propeller pointing up) upon landing, which allows the vehicle to transition again into a hover vehicle. Note that in some embodiments the two wheels 7 and 8 might be replaced by a single wheel which might have a width that is relatively wide as compared with the embodiments of FIGS. 1-4. Other embodiments could have three (or more) wheels.

In an embodiment each wheel is controlled by a separate motor and turning can be achieved by separately adjusting the onboard motor rotational speed of each wheel.

Figure 7:
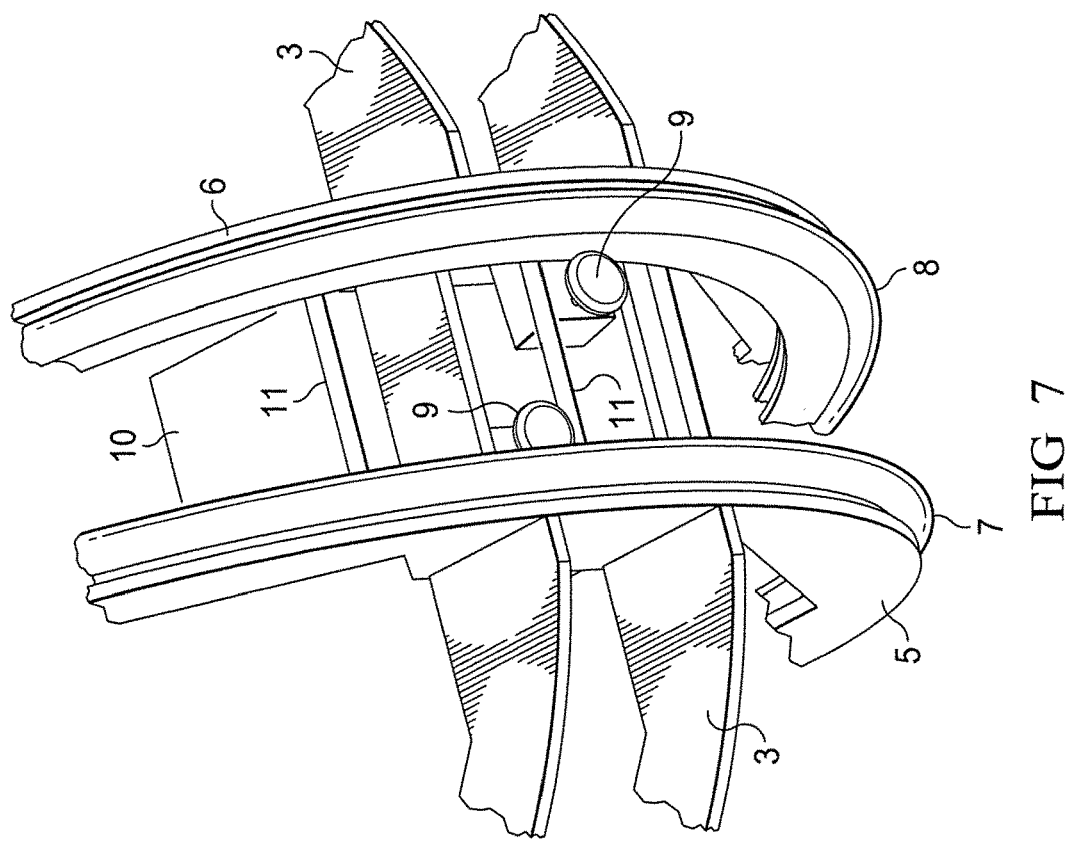
FIG. 7 shows a detailed view of a portion of a surface drive embodiment.
Figure 6:
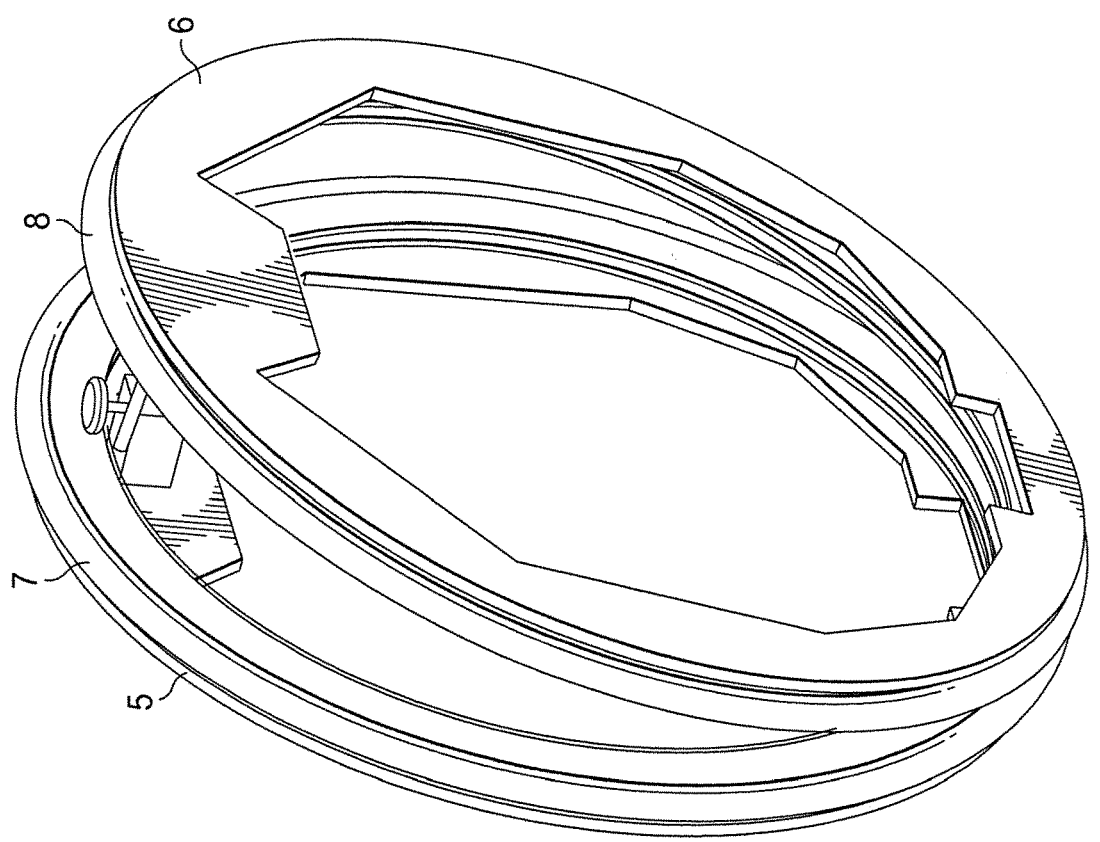
FIG. 6 shows a photographic representation of a portion of the surface drive mechanism.

In more particular, according to one embodiment the wheels 7 and 8 can be activated and controlled individually with a robotic motor which will enable the wheels to simultaneously rotate in opposite directions. This would facilitate turning the vehicle in place while on the ground and would require no forward velocity. According to this variation, when the vehicle is moving forward, the closely spaced wheels 7 and 8 both rotate in the same direction and act as a single wheel. Further, each robotic motor will be in mechanical communication with a small diameter rubber wheel 9 that is mounted either at the top or bottom of the fuselage 10. According to the embodiment of FIG. 7, a small diameter wheel 9 presses perpendicularly against the surface of the wheel 7 to create friction that will urge the wheel 7 into rotation when the small diameter wheel 9 is rotated as shown in FIG. 7. Obviously, other approaches to powering the wheels of this embodiment are possible and those of ordinary skill in the art will readily be able to devise them.

Figure 8C:
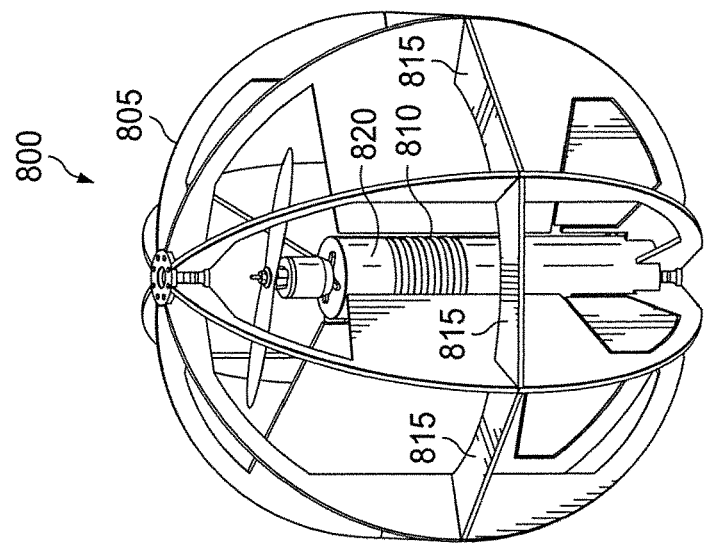
FIGS. 8A 8B, and 8C illustrate a foldable embodiment.
Figure 8B:
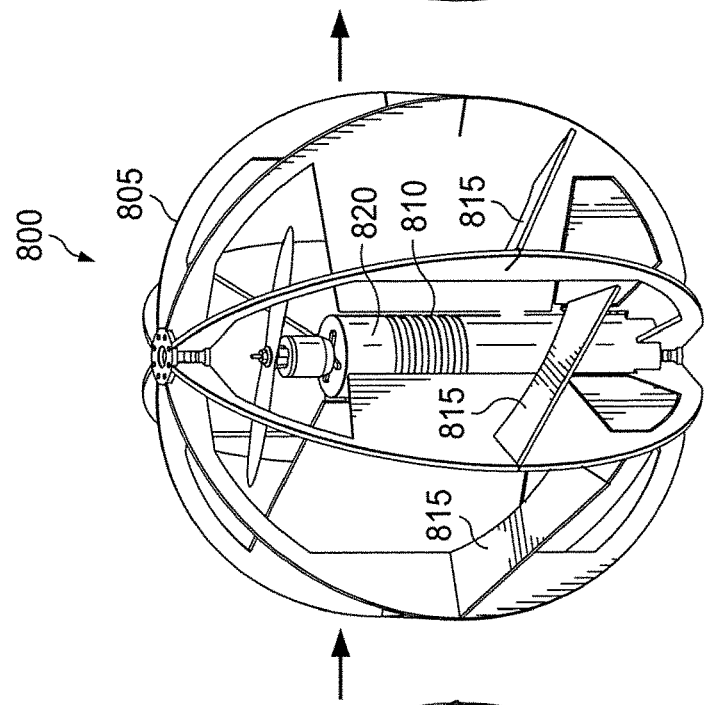
Figure 8A:
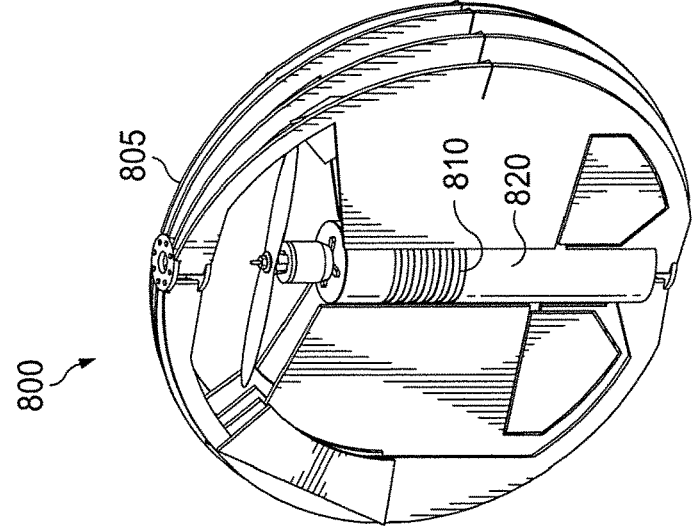

Turning next to FIGS. 8A-8C, an embodiment 800 is foldable as is generally indicated in that figure. According to this example, there is provided a foldable flying sphere 800 called the Origami UFRO (OUFRO). This embodiment has four or more movable frame members 805, each of which is rotatably attached along the central axis of the sphere 800 and which are semicircular on their outer (i.e., away from the central axis) peripheries. Thus, this embodiment will have a generally spherical shape when the frame members 805 are extended into an operational configuration (FIG. 8C) and a generally planar shape when it is folded for transport (FIG. 8A). The semicircular outer periphery of the frame members 805 was chosen for purposes of the embodiments discussed herein to make it possible for the instant device to roll when it is on the ground. This makes it possible, as discussed below, to right itself (i.e., with the propeller at least approximately vertically above the fuselage) and return to a flight-ready ordination after it lands and to move itself along the ground after a landing. Because of its design, the instant embodiment 800 can be folded into a flat shape that makes it easy to store and transport to the location where it is to be utilized.

The images in FIG. 8 show an embodiment during an unfolding sequence (left to right in FIG. 8). This embodiment 800 has a plurality of movable semicircular frame members 805 that are supported by one or more circular plates 810 that act as hinges and are rotatably attached to a central fuselage 820. In some embodiments, each frame member 805 will be attached to the fuselage of the vehicle two circular plates (hinges) 810 located at spaced apart locations on the fuselage 820 (e.g., one near the top of the fuselage 820 and another near its base), thereby providing two points of support to the associated frame member 805. In FIG. 8, the hinges 810 surround a central fuselage 820 that houses at least the avionics, a motor that drives the propeller 830 and a power source for the motor, none of which are illustrated in this particular figure. Although the central fuselage 820 in FIG. 8 is shown to be generally cylindrical in shape throughout its length, it obviously could take any shape that allows the foldable frame members 805 to open and close.

Additionally, and continuing with the present example, there are movable (or removable) flat stiffening members 815 that are located along the equator of the sphere. Each stiffening member 815 is attachable, preferably rotatably attachable, to one of said frame members 805 at one end and removably engageable with an adjacent one of said frame member 805 at the other end. In the embodiment of FIG. 8, the stiffening members 815 are formed as planar surfaces but, of course, such a configuration is not required. In some embodiments, each of the stiffening members 815 will be permanently attached via a hinge at one end to one of the frame members 805 and removably attachable at the other end to another, preferably adjacent, frame member 805, thereby making it possible to rotatably collapse the device into a smaller form factor by disengaging the stiffening members 815 when the aerial device is not in use. According to the embodiment of FIG. 8, stiffening member 815 can be rotated into a locked position between adjacent arches 805 to provide structural stiffness. The fuselage 820 of FIG. 8 is a removable cylindrical tube that carries the avionics and propulsion system.

Although the embodiment of FIG. 8 utilizes separate stiffening members 815 that are situated remotely from the central fuselage 820, other embodiments might utilize a locking mechanism within the fuselage that does not require such a separate stiffening component. That being said, for larger embodiments separate stiffening elements that are situated proximate to the external edge of the frame members 805 would most likely be beneficial.

Figure 9A:
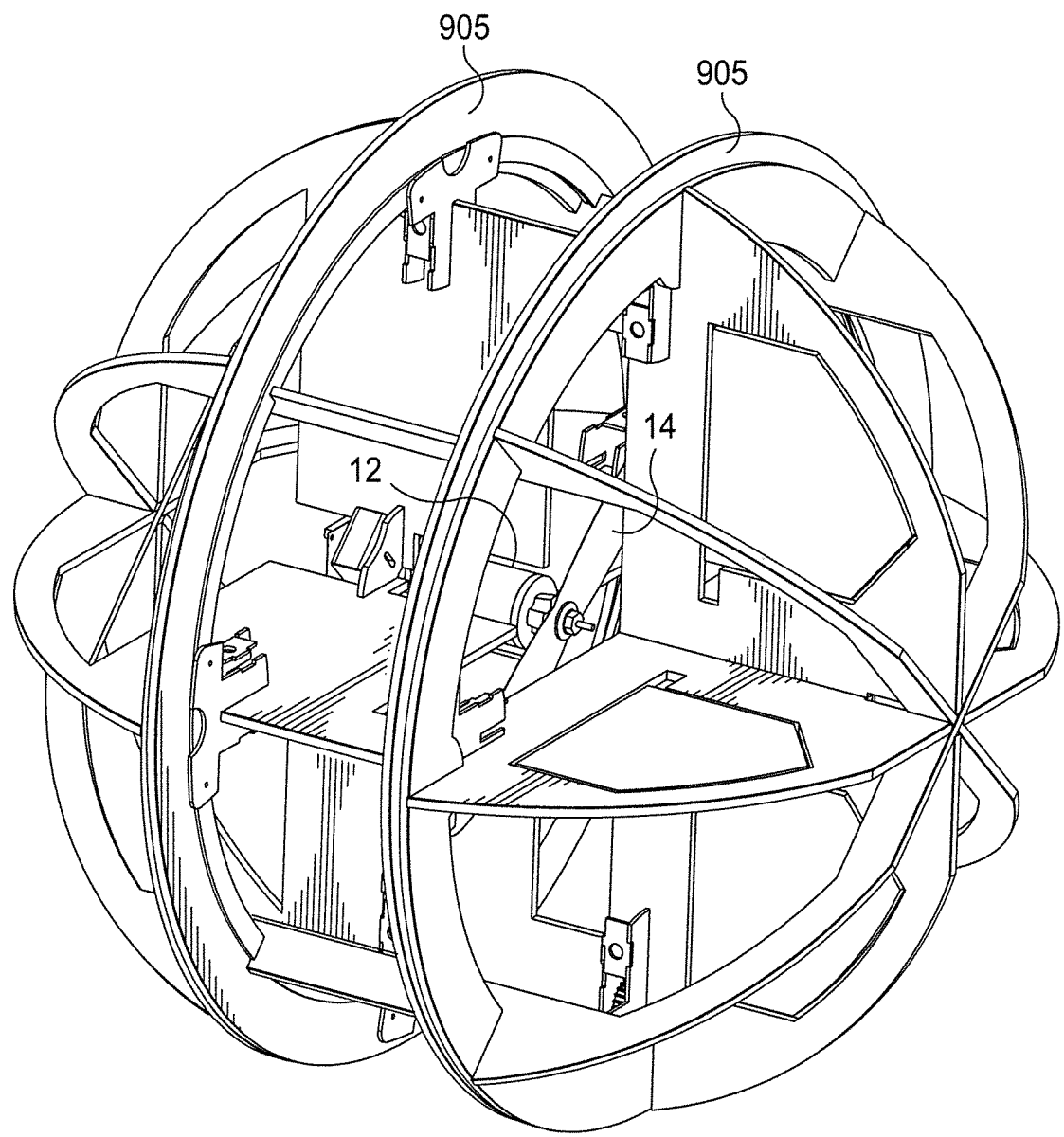
FIGS. 9A and 9B contain schematic illustrations of a rover embodiment as viewed with the axis of the propeller oriented horizontally and vertically, respectively.
Figure 9B:
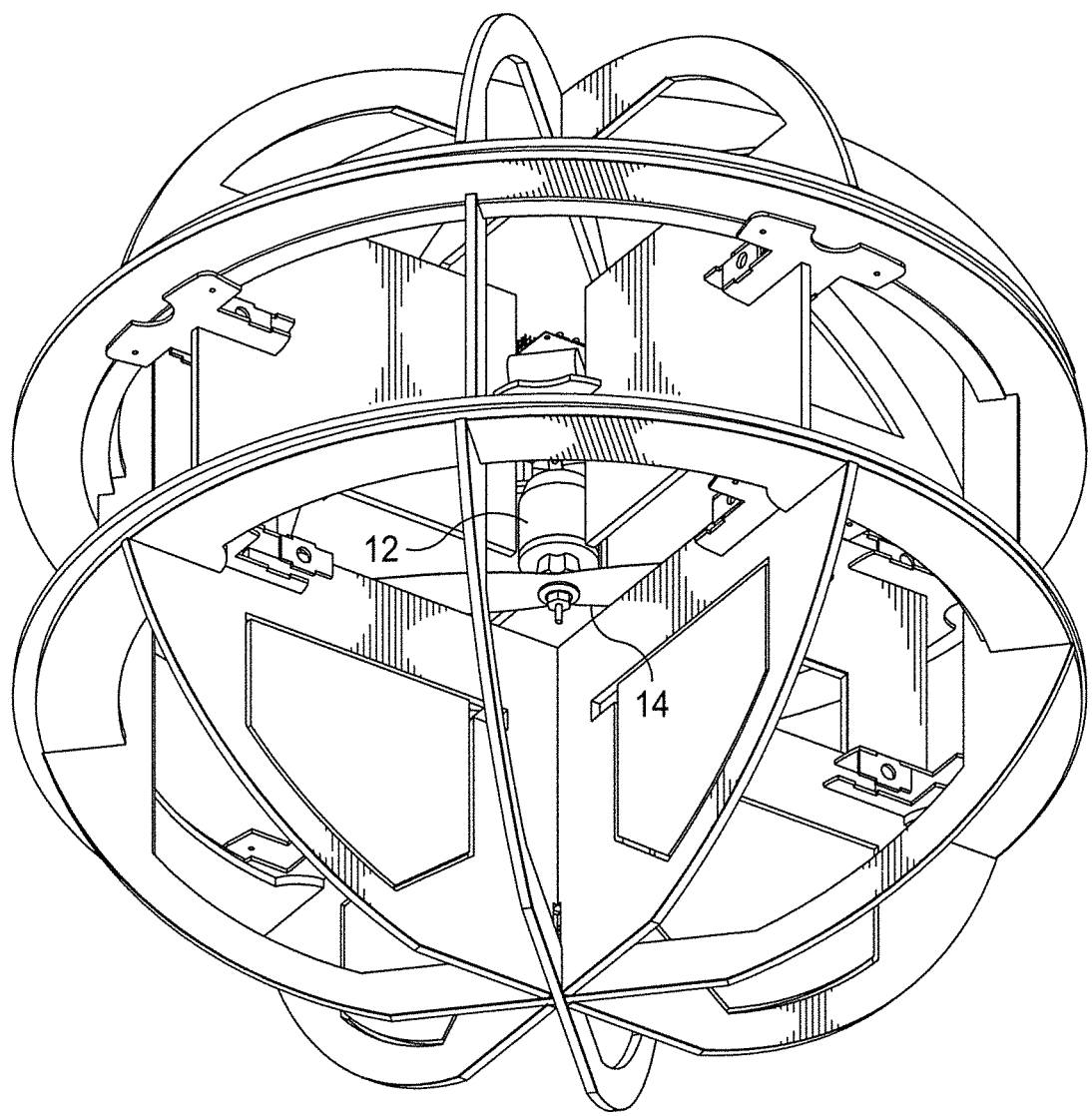

FIGS. 9A and 9B contain views of an embodiment that contains rover wheels 905 that are located on the periphery of the sphere and that are parallel to each other and to the sphere's equator. More generally, each of the rover wheels 905 in this embodiment should roughly correspond to a "circle of the sphere" with respect to the generally spherical shape defined by the frame members, with a "circle of a sphere" being the result of interesting a plane with a sphere. Each of the rover wheels 905 will need to project beyond the outer extent frame members so that the periphery of each wheel can contact the ground and provide transport when the vehicle is on the ground.

Figure 10:
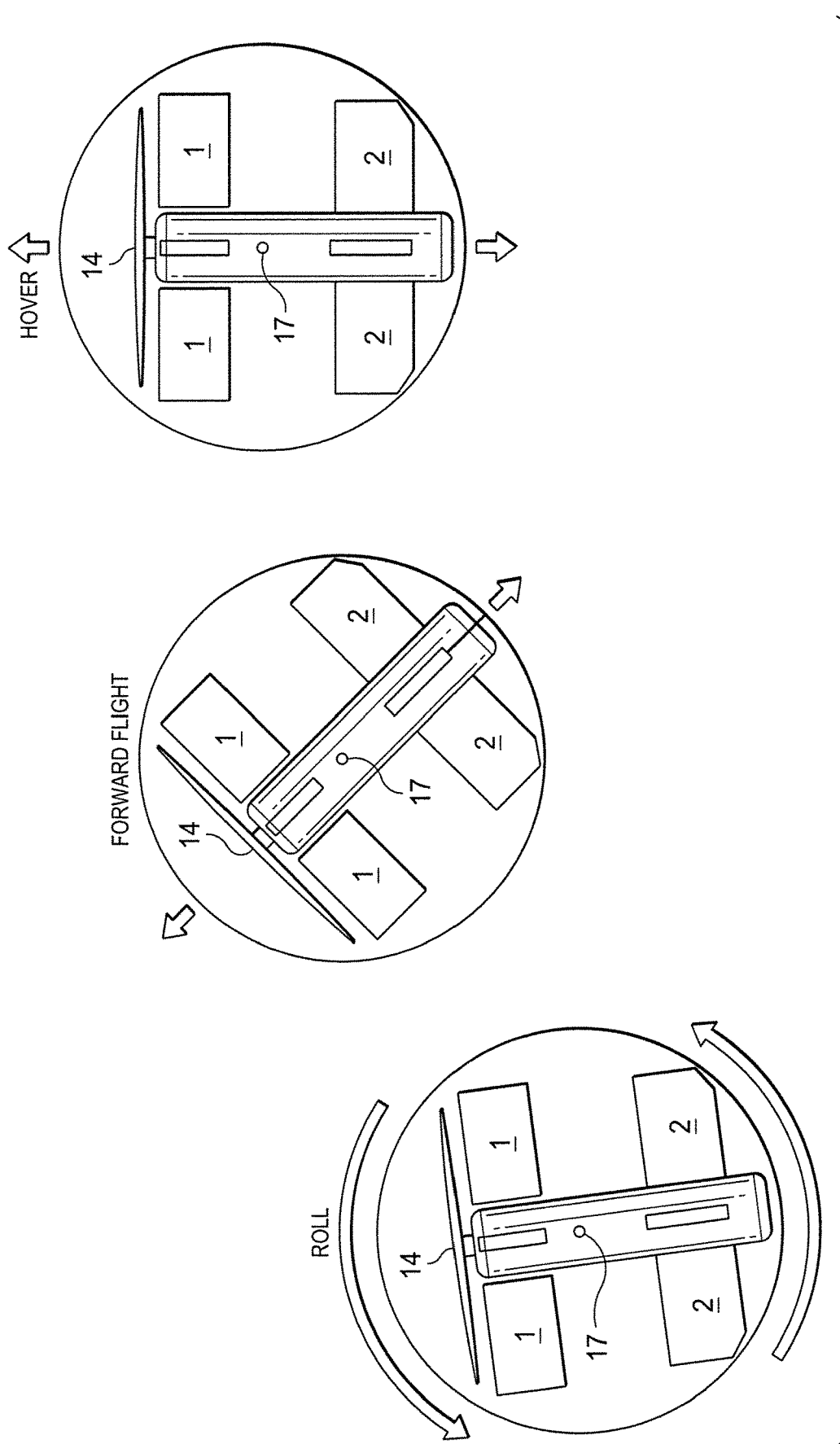
FIG. 10 contains a conceptual illustration of how an embodiment would appear in operations.

In one embodiment, the two rover wheels are parallel to each other and perpendicular to the longitudinal axis defined by the fuselage (FIGS. 9A and 9B) or, in another embodiment, parallel with it (FIGS. 1 and 2). According to this embodiment, the vehicle uses the airstream generated by the propeller to tilt the vehicle 90 degrees and transform the vehicle from an aerial vehicle to a ground vehicle. FIG. 10 illustrates this point.

Turning next to some theoretical elements related to vehicle control of an embodiment, the following nomenclature will be used hereinafter:

T thrust force;
Dx, Dy axial and lateral coordinates of the drag force in body axes;
ρ air density at sea level;
m vehicle's mass;
Ix, Iy, Iz moment of Inertia about the respective body axis system unit vectors;
Fx, Fy, Fz coordinates of the moment vector in body axes;
θ, φ, ψ Euler angle;
θ1, . . . , 8 vane deflection angles;
δp, δr, δy virtual pitch, roll and yaw actuator using vanes, respectively;
ht, hb pitch and roll moment arms from the vanes for the top and bottom vanes, respectively;
dt, db yawl moment arms from the vanes for the top and bottom vanes, respectively;
V⁻ axial velocity of the propeller airflow;
Aprop area of the actuator disk representing the spinning propeller;
d diameter of the propeller;
Kp proportional gain;
Ki integral gain;
Kd derivative gain;
kT, kM rotor thrust and moment coefficient, respectively;
St top vane's surface area;
Sb bottom vane's surface area; and
ω body frame angular velocity.

Figure 11:
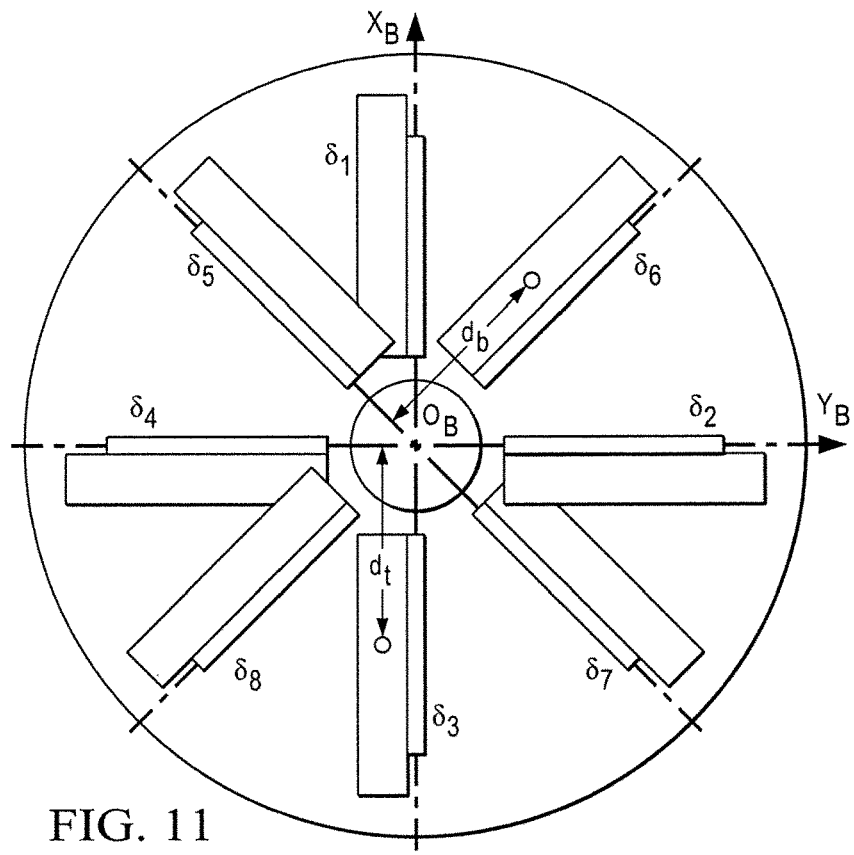
FIG. 11 contains a schematic top-down view of the control vanes of an embodiment.
Figure 12:
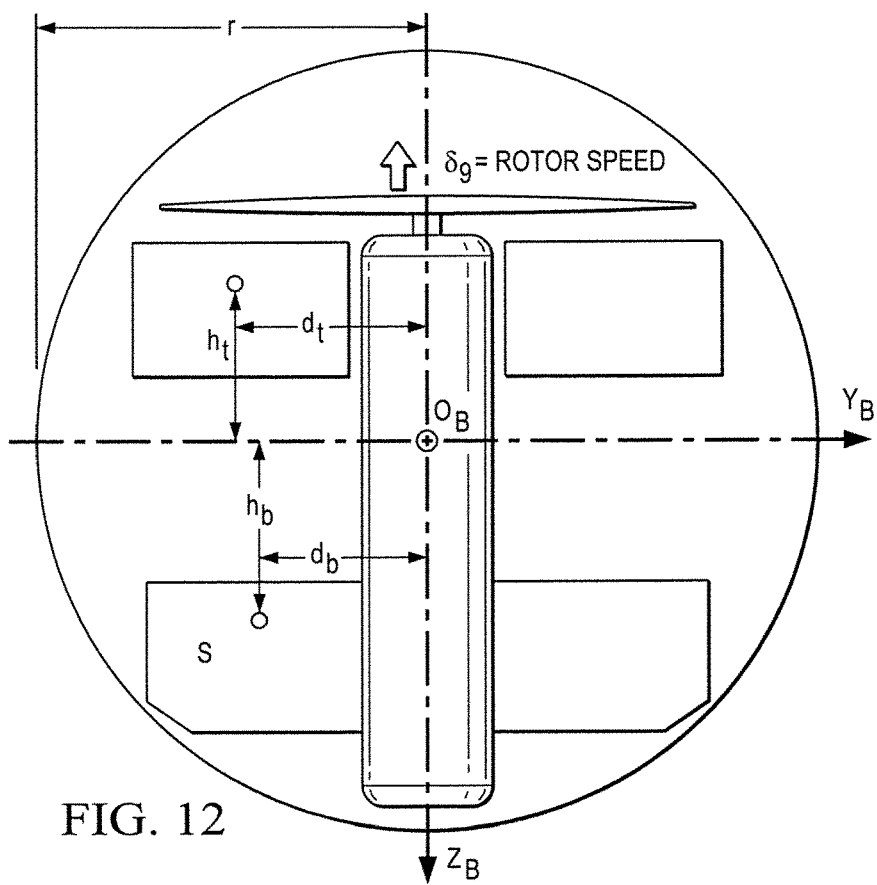
FIG. 12 contains a schematic illustration of the control vanes of an embodiment where the rotor axis is vertical.

Consider the overview of an embodiment of the UFRO as represented by FIGS. 11 and 12. In this embodiment the vehicle is modeled as a rigid body influenced by aerodynamic, propulsion and gravitational forces, and moment acting on the center of mass. The center of mass 17 is located at the meridian of the sphere. The body-fixed frame is established using the right-hand rule by directing the z-axis pointing downward to the direction of the thrust line and y-axis towards the right side of the vehicle. The diagram shows the orientation of the defined body axis system with respect to the vehicle where X-axis pointing into the paper. Six degree of freedom rigid body equations of motion are utilized with Euler angles for attitude parameterization in this embodiment. This is due to the fact that pitch angle close to zero angles for near hover flight. The symbols r, h, d, S, and A represent the radius of the sphere, the height of the center of mass above the flaps center of pressure, the radial distance between the center of mass and the flaps center of pressure, the area of flap and the cross sectional area of the propeller, respectively. Vane 1 and 3 are identified as elevator, to provide forward/backward motion, vanes 2 and 4 are identified as aileron, to provide left/right translation motion. The bottom vanes 5 to 8 are identified as the rudder, to provide rotational motion along the Z-axis.

The deflection angles of the eight vanes are denoted by the symbols 1 to 8 in a clockwise direction. A positive vane deflection is defined as one that results in blockage of the airflow viewing from the top of the sphere as illustrated in FIGS. 11 and 12. Note that vanes denoted by the subscripts 1 to 4 are the top vanes and vanes 5 to 8 are the bottom vanes. The bottom vanes are 45° offset relative to the top vanes. The normalized angular velocities of the rotors are denoted by the control variables $\delta_9$. $O_B$ is the center of mass of the sphere.

In this embodiment it will be convenient to adopt several assumptions to simplify the control analysis where the UAV will operate in hover flight:

magnitude of drag force is negligible compared with the lift forces and thrust;
lift and drag terms vanish at the vertical equilibrium point during hover flight;
CG and the aerodynamic center of the sphere are located at the same point;
vehicle's control vanes are submerged within the propeller air stream;
flow at the control surface is smooth and uniform;
frame of the exoskeleton has little contribution under the slip stream;
downwash created by the top vanes will not affect the bottom vanes; and
deflection angle for each vane is assumed to be small.

Mathematically, these forces and their corresponding moments acting on UFRO a single propeller and 8 vanes can be modeled as follows in an embodiment:

$$F_x = qS_tC_L(\delta_2 + \delta_4) - qS_bC_L\cos45°(\delta_5 + \delta_6 + \delta_7 + \delta_8) - mg\sin(\theta) - D_x$$

$$F_y = qS_tC_L(\delta_1 + \delta_3) - qS_bC_L\cos45°(\delta_5 - \delta_6 + \delta_7 - \delta_8) - mg\cos(\theta)\sin(\phi) - D_y$$

$$F_z = qS_tC_D(|\delta_1| + |\delta_2| + |\delta_3| + |\delta_4|) - qS_bC_D\cos45°(|\delta_5| + |\delta_6| + |\delta_7| + |\delta_8|) - mg\cos(\theta)\cos(\varphi) - k_T\delta_9^2$$

$$M_x = qS_tC_Lh_t(\delta_1 + \delta_3) - qS_bC_Lh_b\cos45°(\delta_5 - \delta_6 + \delta_7 - \delta_8) + qS_tC_DD_t(|\delta_2| - |\delta_4|) + qS_bC_DD_b\cos45°(|\delta_6| - |\delta_5| + |\delta_7| - |\delta_8|)$$

$$M_y = qS_tC_Lh_t(\delta_2 + \delta_4) - qS_bC_Lh_b\cos45°(\delta_5 + \delta_6 + \delta_7 + \delta_8) + qS_tC_DD_t(|\delta_3| - |\delta_1|) + qS_bC_DD_b\cos45°(|\delta_7| - |\delta_6| + |\delta_8| - |\delta_5|)$$

$$M_z = qS_tC_Ld_t(\delta_1 - \delta_3 + \delta_4 - \delta_2) - qS_bC_Ld_b\cos45°(\delta_6 + \delta_7 - \delta_8 - \delta_5) - k_m\delta_9^2 \text{ with, } q = \frac{1}{2}\rho V^2, V = \sqrt{\frac{T}{2\rho A_{prop}}}, \text{ and } T = K_T\delta_9^2.$$

Note that the drag of the vanes has been considered negligible in the linear models set out above. For control system implementation purposes, the following virtual vanes that corresponding to pitch, roll, and yaw were defined:

$$\delta_p = \delta_2 + \delta_4 = \delta_5 + \delta_6 + \delta_7 + \delta_8$$

$$\delta_r = \delta_1 + \delta_3 = \delta_5 - \delta_6 + \delta_7 - \delta_8$$

$$\delta_y = |\delta_1| - |\delta_3| + |\delta_4| - |\delta_2| = |\delta_6| + |\delta_7| - |\delta_8| - |\delta_5|.$$

The forgoing can be linearized about a hover trim condition at an arbitrary three-dimensional position which yields the following linear, decoupled small perturbation dynamic in state-space form:

1) the attitude equation links the altitude z, the climbing rate $v_z$ and the thrust, T:

$$\begin{bmatrix} \dot{z} \\ \dot{w} \end{bmatrix} = \begin{bmatrix} 0 & 1 \\ -\frac{F_x}{m} & 0 \end{bmatrix} \begin{bmatrix} z \\ w \end{bmatrix} + \begin{bmatrix} 0 \\ \frac{1}{m} \end{bmatrix}(T - mg)$$

2) the pitch equation links the forward velocity, $V_x$, the pitch angle $\theta$ and rate q, the pitch moment $M_x$:

$$\begin{bmatrix} \dot{u} \\ \dot{\theta} \\ \dot{q} \end{bmatrix} = \begin{bmatrix} 0 & g & 0 \\ 0 & 0 & 1 \\ 0 & 0 & 0 \end{bmatrix} \begin{bmatrix} u \\ \theta \\ q \end{bmatrix} + \begin{bmatrix} \frac{F_x}{m} \\ 0 \\ \frac{M_y}{I_y} \end{bmatrix}$$

3) the roll equation links the lateral speed $V_y$, the roll angle $\varphi$ and rate p and the roll moment $M_y$:

$$\begin{bmatrix} \dot{u} \\ \dot{\varphi} \\ \dot{p} \end{bmatrix} = \begin{bmatrix} 0 & g & 0 \\ 0 & 0 & 1 \\ 0 & 0 & 0 \end{bmatrix} \begin{bmatrix} v \\ \varphi \\ p \end{bmatrix} + \begin{bmatrix} \frac{F_y}{m} \\ 0 \\ \frac{M_x}{I_x} \end{bmatrix}$$

4) and finally, the yaw equation links the heading $\psi$ and the yaw rate r and yaw moment $M_z$:

$$\begin{bmatrix} \dot{\psi} \\ \dot{r} \end{bmatrix} = \begin{bmatrix} 0 & 0 \\ 1 & 0 \end{bmatrix} \begin{bmatrix} \psi \\ r \end{bmatrix} + \begin{bmatrix} 0 \\ \frac{M_z}{I_z} \end{bmatrix}$$

As the vehicle is axis symmetric in both XZ and YZ plane, the model can be further simplified where $I_y = I_x$. This makes pitch and roll dynamics are described by similar equations. For this reason, a similar expression for the control of the roll axis can be directly deduced.

Figure 14:
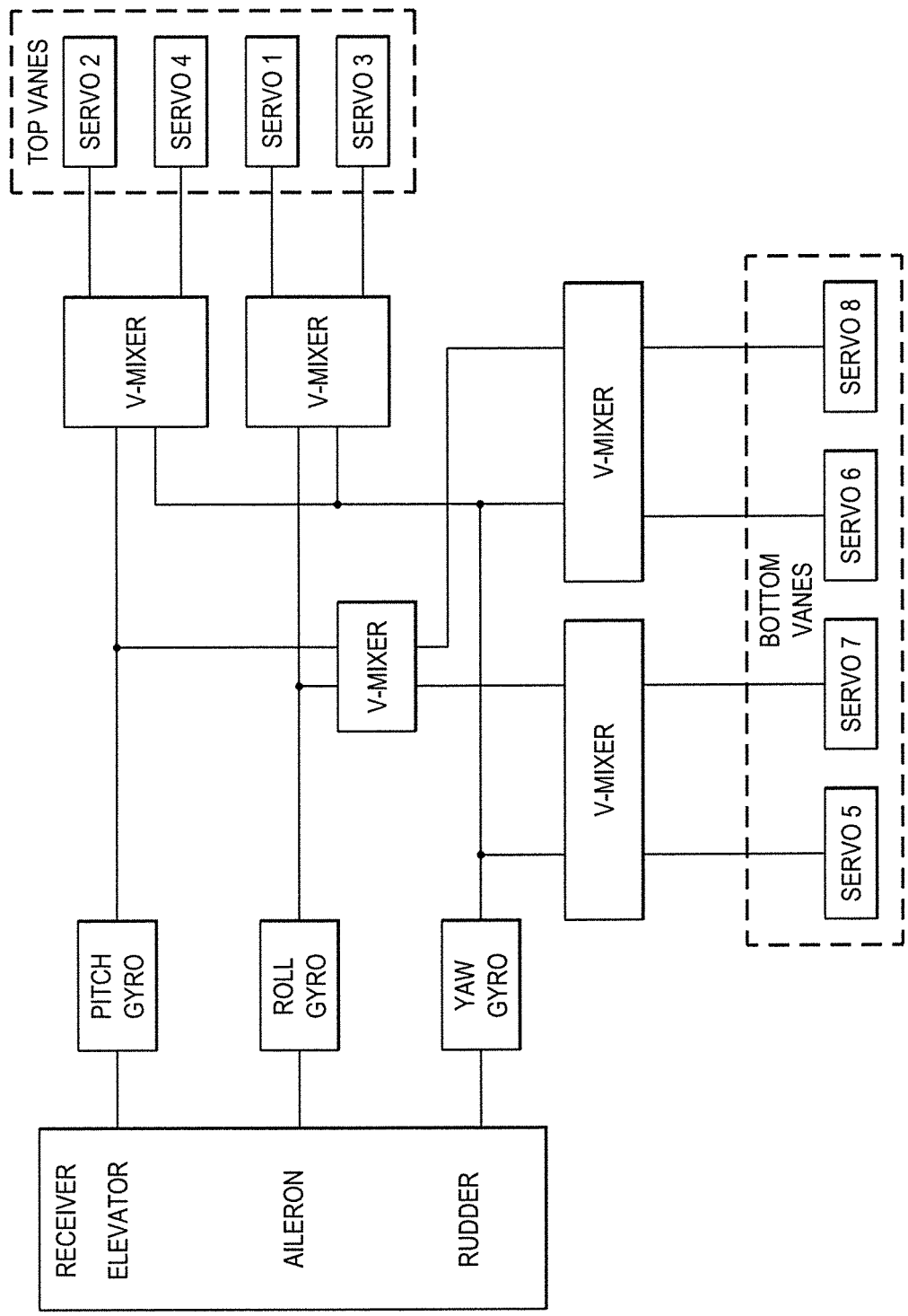
FIG. 14 illustrates a hardware arrangement suitable for use with an embodiment.

According to an embodiment, a hover-mode flight test was designed with a focus toward stabilizing 3 degree of freedom attitude dynamic on roll, pitch, and yaw. For purposes of this embodiment, the altitude controller will be neglected, and the throttle setting were manually controlled by the pilot. The control command sent to the control surfaces corresponding to each axis is as follows:

$$\delta_i = K_p\omega_i\delta_i = K_p\omega_i + K_i\int\omega_i dt + K_d\omega_i,$$

where i=p, r and y. The PID gains are provided by the ultimate sensitivity method, and tuned by trial and error. FIG. 14 shows an exemplary schematic that illustrates how an embodiment might be configured using, in this example, servos that are set up using five additional V-mixers to provide the vanes control scheme as discussed previously.

By way of explanation, those of ordinary skill in the art will know that a v-mixer is an advanced electronic servo mixer (signal mixer) for flying wings and V-tail gliders and planes.

Figure 13:
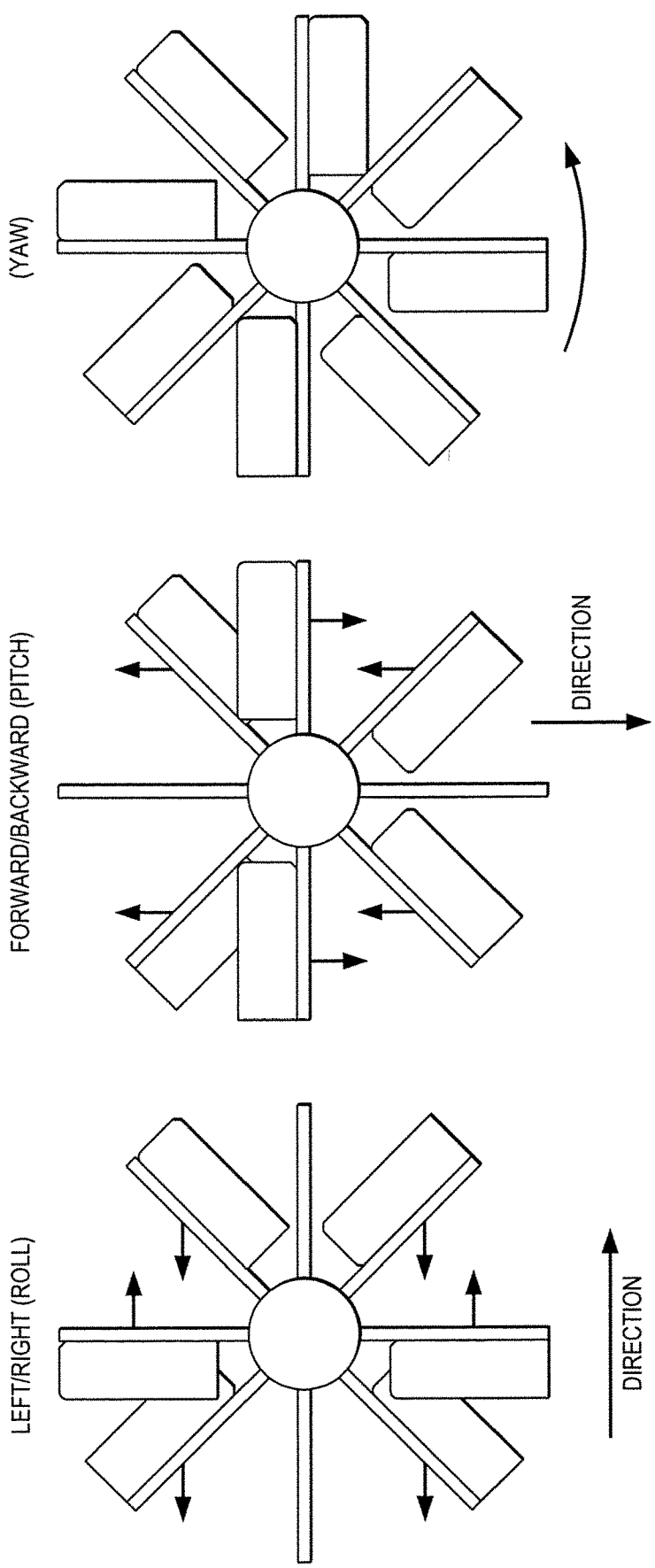
FIG. 13 contains a schematic illustration of the resultant force due to vane deflections for an embodiment.

FIGS. 13 and 15A and 15B illustrate further embodiments. More particularly, FIG. 13 illustrates an example of the resultant force due to vane deflections according to an embodiment. FIGS. 15A and 15B illustrate embodiments of a ground-mobile configuration that has improved mobility. According to this example, there are two tracks 1520 that are designed to rotate either synchronously or asynchronously, either independently or simultaneously, either in the same direction or not, etc. as the need requires. Additionally, and according to this embodiment, there will be an avionic compartment 1510, control surfaces 1540, and a contra-rotating propeller 1550. Although certain embodiments discussed herein have utilized eight control vanes, those of ordinary skill in the art will realize that more (or fewer) vanes might be utilized depending on the requirements of the particular application and the goals of the designer.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this should be interpreted to mean a range of numerical values where the lower limit is the first number and the upper limit is the second number. For example, 25 to 100 should be interpreted to mean a range with a lower limit of 25 and an upper limit of 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objectives and attains the ends and advantages mentioned above as well as those inherent therein.

While the invention has been described and illustrated herein with reference to certain embodiments in relation to the accompanying drawings, various changes and further modifications may be made therein by those skilled in the art without departing from the spirit of the invention, the scope of which is determined from the appended claims.

What is claimed is:

1. A foldable unmanned aerial vehicle, comprising:
   a. a fuselage, said fuselage containing a power source and avionics in electrical communication with said power source;
   b. a CPU, said CPU in electronic communication with said power source and said avionics, said CPU at least for wirelessly receiving commands from a user and controlling said vehicle during a flight according to said received commands;
   c. at least one propeller in mechanical communication with said power source and in mechanical communication with said fuselage, said at least one propeller rotatable under control of said CPU and in response to commands from the user;
   d. at least four vertically oriented frame members,
      each of said frame members rotatably supported on an inner edge by a hinge, said hinge attached to said inner edge of said frame member and to said fuselage, and
      each of said frame members having a generally continuous semicircular shape on an outer periphery, wherein said at least four frame members are rotatable about said fuselage between a planar configuration and spherical configuration.

2. The foldable unmanned aerial vehicle according to claim 1, further comprising:
  e. at least one stiffening member, each of said at least one stiffening member attached at one end to one of said at least four frame members and at an opposite end to an adjacent one of said at least four frame members.

3. The foldable unmanned aerial vehicle according to claim 2, wherein each of said at least one stiffening member is rotatably attached at said one end to one of said at least four frame members and removably attached at an opposite end to said adjacent one of said at least four frame members.

4. The foldable unmanned aerial vehicle according to claim 2, wherein each of said at least one stiffening member is a planar surface.

5. The foldable unmanned aerial vehicle according to claim 2, wherein one or more of said at least one propeller is reversible in rotational direction under control of said CPU between a forward direction to generate thrust for flight and a reverse direction.

6. A foldable unmanned aerial vehicle, comprising:
  (a) a fuselage;
  (b) a power source within said fuselage;
  (c) a propulsion system within said fuselage in electrical communication with said power source;
  (d) at least one propeller in mechanical communication with said propulsion system, wherein one or more of said at least one propeller is rotatable by said propulsion system in a forward direction to provide thrust for flight;
  (e) avionics mounted within said fuselage to receive wireless commands from a user, said avionics at least for controlling a flight of said vehicle according to said received commands;
  (f) at least four vertically oriented frame members mounted in a spaced-apart configuration around said fuselage,
    each of said frame members rotatably supported on an inner edge by a hinge, said hinge attached to said inner edge of said frame member and to said fuselage; and
    each of said frame members having a generally continuous semicircular shape on an outer periphery, wherein said at least four frame members are rotatable about said fuselage between a planar configuration and a spherical configuration; and
  (g) a CPU in said fuselage, said CPU in electronic communication with said avionics and said propulsion system, said CPU at least programed to perform the steps of:
    (i) interpreting commands from the user and
    (ii) controlling said propulsion system in response to said interpreted commands from the user.

7. The foldable unmanned aerial vehicle according to claim 6, further comprising:
  (h) at least one stiffening member, said at least one stiffening member engageable on a first end to one of said at least four frame members and engageable on a second end to an adjacent one of said at least four frame members.

8. The foldable unmanned aerial vehicle according to claim 7, wherein each of said at least one stiffening member is rotatably attached at said first end to one of said at least four frame members and removably engageable on said second end to an adjacent one of said at least one stiffening members.

9. The foldable unmanned aerial vehicle according to claim 7, wherein each of said at least one stiffening member has a planar surface.

10. The foldable unmanned aerial vehicle according to claim 6, wherein one or more of said at least one propeller is rotatable by said propulsion system in a reverse direction opposite to said forward direction for flight.

11. The foldable unmanned aerial vehicle according to claim 10, wherein said CPU is programmed at least to:
  (i) interpret commands from the user,
  (ii) control said propulsion system according to said commands from the user,
  (iii) direct said propulsion system to rotate said at least one propeller in either said forward or said reverse direction;
  (iv) determine an orientation of said vehicle,
  (v) when said determined orientation of said vehicle is an upright orientation, instruct said propulsion system to rotate said at least one propeller in said forward direction, and
  (vi) when said determined orientation of said vehicle is not in said upright orientation, instruct said propulsion system to rotate said at least one propeller in said reverse direction until said vehicle is at least approximately in said upright orientation.

* * * * *